United States Patent [19]
Lewandowski et al.

[11] 4,387,534
[45] Jun. 14, 1983

[54] BOOK END PLANTER

[76] Inventors: Raymond J. Lewandowski, c/o George Spector, 3615 Woolworth Bldg., 233 Broadway; George Spector, 3615 Woolworth Bldg., 233 Broadwy, both of New York, N.Y. 10007

[21] Appl. No.: 291,300
[22] Filed: Aug. 10, 1981
[51] Int. Cl.³ .............................................. A01G 9/02
[52] U.S. Cl. ...................................... 47/66; D6/107; 29/256; 40/107; 109/54; 312/204
[58] Field of Search ..................... 29/256; 109/53, 54; 47/41, 41.11, 66, 67, 79-81; 312/204; 211/11, 42; 40/107, 115, 120, 358; D6/106, 107; D19/20-24

[56] References Cited

U.S. PATENT DOCUMENTS

| D. 107,749 | 1/1938 | Cornwall | 211/42 X |
| D. 130,924 | 12/1941 | Rossi | D6/107 |
| D. 137,162 | 2/1944 | Gerson | D6/107 |
| D. 169,657 | 5/1953 | Cravey | D6/107 |
| D. 223,837 | 6/1972 | Martin | D11/144 |
| 455,648 | 7/1891 | Weaver | 40/358 |
| 508,895 | 11/1893 | Myers | 109/54 |
| 1,455,464 | 5/1923 | Iribe | 302/204 |
| 1,815,195 | 7/1931 | Favata | 47/67 |
| 2,380,678 | 7/1945 | Sengbusch | 211/11 |
| 2,436,719 | 3/1949 | Schackett | 47/66 |
| 2,620,929 | 12/1952 | Sportsman | 211/43 |
| 3,183,624 | 5/1965 | Swett | 47/41.11 |
| 3,468,048 | 9/1969 | Smith | 40/107 |
| 3,557,965 | 1/1971 | Algerholm | 211/11 |

FOREIGN PATENT DOCUMENTS

| 444037 | 10/1912 | France | 40/120 |
| 644942 | 6/1928 | France | 312/204 |
| 1744802 | 1/1933 | France | 47/4 |
| 8624 | of 1889 | United Kingdom | 211/42 |

OTHER PUBLICATIONS

Johnson, F. "Moon Mallins" *Daily News* 6-14-76, Volume and Page No. Unknown.

*Primary Examiner*—James R. Feyrer

[57] ABSTRACT

A book end for resting upon a flat, horizontal surface and hold upright books from falling over; the book end including therewith a flower pot, a pencil caddy, and several slotted racks for holding assorted mail; the end wall of the device displaying a calendar.

2 Claims, 4 Drawing Figures

BOOK END PLANTER

This invention relates generally to book ends such as are used to hold books upright upon a shelf, desk or the like.

Desks and tables tend to become cluttered with mail papers, books etc, thereby becoming inefficient for effective usage. This is objectionable, and is therefore in need of an improvement.

Accordingly, it is a principal object of the present invention to provide an organizer for placement upon a desk, table or shelf and which serves as a book end to hold up books, magazines or catalogues, and which also includes a planter for a growing plant in order make a pleasing decoration; the organizer having slotted compartments for sorted mail and papers as well as a caddy for keeping writing implements handy and a readily viewed calendar.

Another object is to provide a book end planter in which a secret compartment under the planter serves to unsuspectingly hide small articles or value, such as money, jewelry and the like.

Still a further object is to provide a book end planter in which the slotted compartments, used for mail and papers, are adjustable in size.

Figure 1:
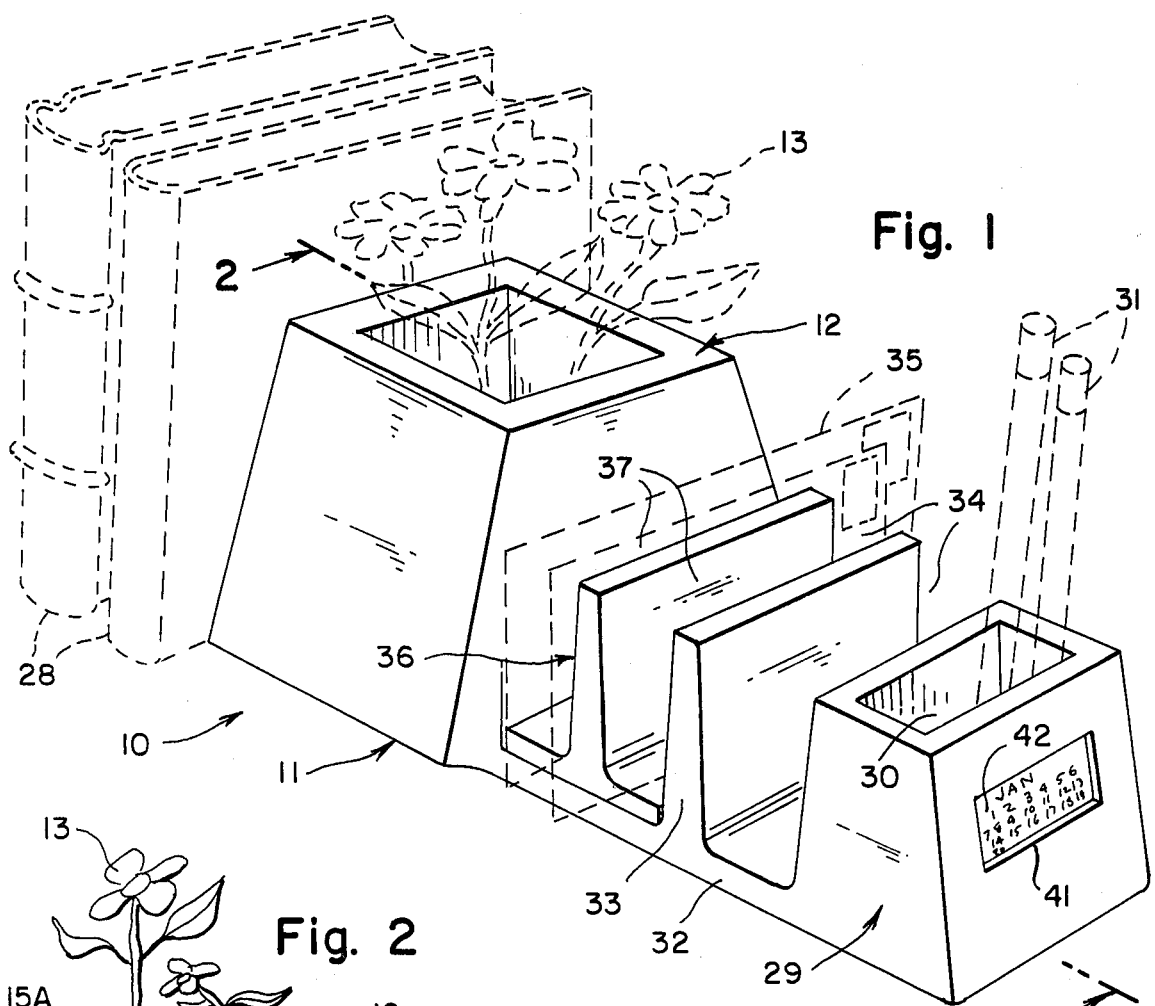
FIG. 1 is a perspective view of the invention, and shown including a removable, intermediate partition for changing slot compartment sizes.

Referring now to the drawing in greater detail, the reference numeral 10 represents a book end planter, according to the present invention, wherein there is a main body member 11 that may be molded either from a ceramic, plastic, metal or any other suitable material that will be attractive. It includes a plant pot 12 at one end of the main body and in which soil may be placed so to grow a real plant 13.

The pot is formed by four downwardly converging walls 14 and horizontal bottom wall 15 so to surround a hole 16 into which the soil and plant roots are placed. The upper edges of the four walls 14 are integral with four downward outer walls 15 so to form a space 16 therebetween and into which a cup-shaped cover 17 is slidable from an underside, so to form a secret pocket 18 between a bottom wall 19 of the cap and the bottom wall 15 of the pot. The cover is flush with a lower end of the walls 15 and is snug thereagainst being held frictionally in place by a protrusion 20 on two walls 14 of the pot snap-fitting in a recess 21 on two of the cover walls 22. Thus a stranger cannot pull or pry off the cover so to gain access to the secret pocket. The outer walls 15 fully hide the cover from a side.

Proper access however, is made possible to the pocket by means of a screw 23 extending through a hole 24 in a center of the pot bottom wall, and which is thread engaged in a hollow stem 25 hidden inside the pot by the plant soil. When a knowledgeable person rotates the stem, the screw is thus lowered so that a screw head 26 pushes against the cover bottom wall 19 so to remove the cover. In the installed position of the screw, the hole 24 is made watertight by a rubber gasket or washer 27 adjacent the head 26, so that the plant may be watered.

One of the walls 15A located on an end of the main body, is vertical and flat so that books 28 may be stood up thereagainst, as shown in FIG. 1.

A pen and pencil caddy 29 formed upon an opposite end of the main body includes an open hole 30 in which pens and pencils 31 are supported upright so to be convenient to grasp when wanted.

A horizontal base wall 32 formed between the pot and caddy, is integral with a vertical partition 33 so to form slots 34 in which papers and mail 35 can be held in a stored position.

Figure 2:
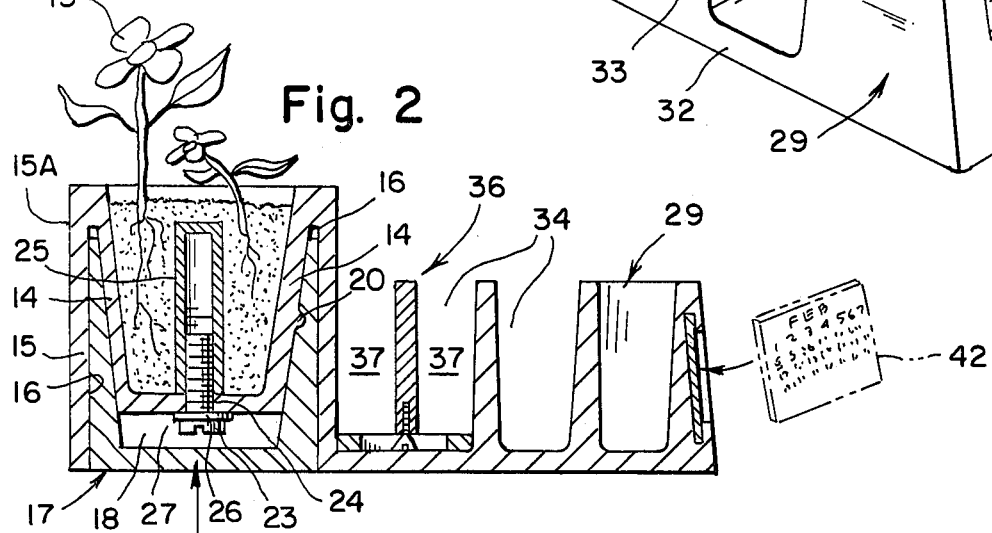
FIG. 2 is a cross sectional view on line 2—2 of FIG. 1, and showing a modification thereof including a secret bottom compartment closable by an underside cover removable by a disguised inner screw.
Figure 3:
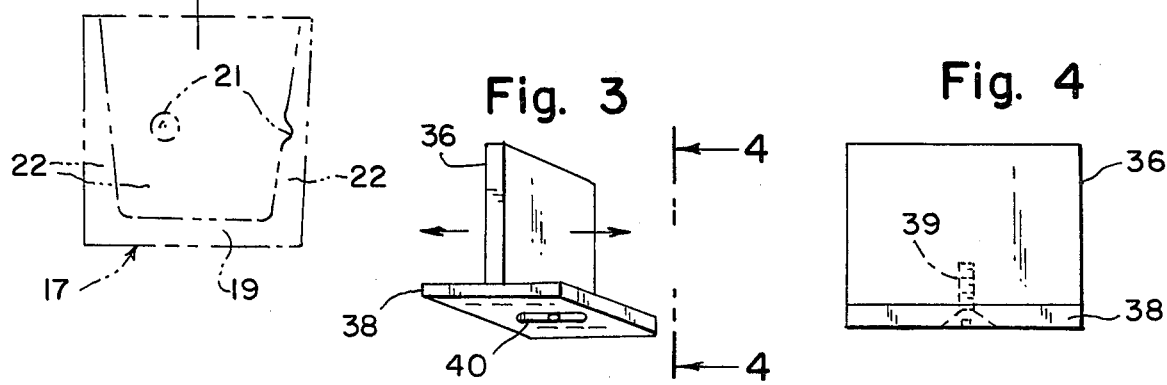
FIG. 3 is a bottom perspective view of a removable, adjustable partition shown in FIG. 2.
Figure 4:
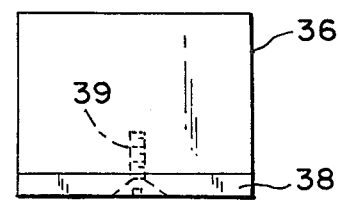
FIG. 4 is an end view of the partition shown in FIG. 3, as viewed on line 4—4 of FIG. 3.

One of the slots can be further divided by a removable partition 36 so to form additionally divided slots 37. The slots 37 may be made adjustable in width, as shown in FIGS. 2 through 4, by means of the partition 36 being movable on a horizontal panel 38 that fits inside the slot 34. A single screw 39 extending upward through a long groove 40 in the panel 38 is screw engaged in the partition 36, so that adjustment of the screw in the groove allows moving the partition, as wished. The partition is pivotable on the panel.

A recess 41 in an end face of the caddy, removably receives a calendar 42 so to be convenient for observation.

What is claimed as new, is:

1. A book end planter comprising in combination, a main body member including a plant pot at one end thereof and a pen and pencil caddy at its opposite end, a secret pocket under said pot closed by a downwardly removable cover, a screw vertically movable by a hidden stem in said pot for urging against said cover for removal thereof, and a plurality of mail slots formed between said pot and caddy by means of vertical partitions upon a horizontal base wall of said mail body.

2. The combination as set forth in claim 1 wherein one said partition comprises a removable member consisting of a vertical wall adjustably mounted on a horizontal panel.

* * * * *